United States Patent [19]

Evers et al.

[11] Patent Number: 5,066,769
[45] Date of Patent: Nov. 19, 1991

[54] CROSSLINKABLE RIGID-ROD AROMATIC HETEROCYCLIC POLYMER

[75] Inventors: Robert C. Evers; My Dotrong, both of Dayton, Ohio

[73] Assignee: The United States of America as represented by the Secretary of the Air Force, Washington, D.C.

[21] Appl. No.: 498,253

[22] Filed: Mar. 23, 1990

[51] Int. Cl.⁵ .............................................. C08G 75/32
[52] U.S. Cl. .................................. 528/337; 528/183; 528/190; 528/339; 528/344; 528/348
[58] Field of Search ............... 528/337, 339, 344, 348, 528/183, 190

[56] References Cited

U.S. PATENT DOCUMENTS 4,835,246  5/1989  Tsai et al. ............................ 528/337

OTHER PUBLICATIONS

Polymeric Materials: Science and Engineering, vol. 60, pp. 507–511 and 512–516, ACS, 1989.

*Primary Examiner*—Harold D. Anderson
*Attorney, Agent, or Firm*—Charles E. Bricker; Donald J. Singer

[57] ABSTRACT

There is provided a para-ordered, rigid-rod aromatic heterocyclic copolymer having repeating groups of the formula:

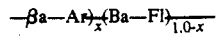

wherein x has a value of 0.50 to 0.99, Fl is a 2,7-fluorene moiety, Ar is a para-ordered arylene group and Ba is a benzazole group of the formula:

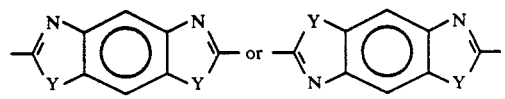

wherein Y is S or O.

5 Claims, No Drawings

CROSSLINKABLE RIGID-ROD AROMATIC HETEROCYCLIC POLYMER

RIGHTS OF THE GOVERNMENT

The invention described herein may be manufactured and used by or for the Government of the United States for all governmental purposes without the payment of any royalty.

BACKGROUND OF THE INVENTION

This invention relates to para-ordered aromatic heterocyclic copolymers. In particular, this invention relates to crosslinkable, para-ordered aromatic heterocyclic copolymers.

Para-ordered, rigid-rod aromatic heterocyclic polymers, such as poly(p-phenylenebenzobisthiazole) (PBT) and poly(p-phenylenebenzobisoxazole) (PBO) are well known for their outstanding thermal, physical and chemical properties. These polymers exhibit lyotropic behavior in strongly acidic solvents, such as methanesulfonic acid (MSA) or polyphosphoric acid (PPA) and can be readily spun into fibers or made into films which have exceptional tensile strength and modulus. The high thermooxidative stability of these fibers and films, together with their exceptional tensile properties and electrical non-conductivity make them obvious candidates as a reinforcement in advanced composite materials. However, a serious obstacle to the successful use of PBT or PBO fibers in high temperature composites is their relatively low compressive strength. Tsai et al, U.S. Pat. No. 4,835,246, disclose para-ordered, rigid-rod aromatic heterocyclic polymers having pendant benzazole groups, which exhibit increased compressive strength. We have sought to increase compressive strength through crosslinking of the polymers.

Accordingly, it is an object of the present invention to provide novel para-ordered, rigid-rod aromatic heterocyclic polymers having increased compressive strength.

Other objects, aspects and advantages of the present invention will become apparent to those skilled in the art from a reading of the following detailed description of the invention.

SUMMARY OF THE INVENTION

In accordance with the present invention, there is provided a para-ordered, rigid-rod aromatic heterocyclic copolymer having repeating groups of the formula:

wherein x has a value of 0.50 to 0.99, F1 is a 2,7-fluorene moiety, Ar is a para-ordered arylene group and Ba is a benzazole group of the formula:

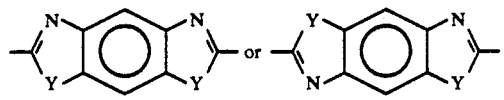

wherein Y is S or O.

The para-ordered arylene group Ar can be 1,4-phenylene, 4,4'-biphenylene, or the like.

The 2,7-fluorene moiety F1 has the formula:

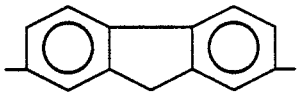

The copolymer of this invention is prepared by reacting an amino monomer of the formula:

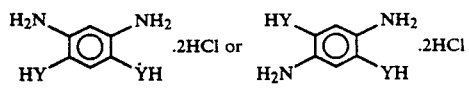

respectively, wherein Y is as defined above, with a para-ordered aromatic dicarboxylic acid, HOOC-Ar-COOH, or its acid halide or nitrile, and 2,7-fluorenedicarboxylic acid or its acid halide or nitrile, in polyphosphoric acid (PPA). The reaction is carried out at polymer concentrations of about 2–15 % (w/w) at a reaction temperature of about 140° to 165° C.

In carrying out the polymerization, the amino monomer is initially dehydrochlorinated. This is accomplished by mixing the amino monomer, the para-ordered aromatic dicarboxylic acid and the fluorene compound with polyphosphoric acid and heating the mixture under an inert gas atmosphere at a temperature ranging from about 60° to 80° C. for a period of about 6 to 24 hours. In general, stoichiometric quantities of the monomers, i.e., amino compound to total diacid compounds, are used, although a slight excess of one of the monomers may be used. The ratio of the fluorene compound to the second dicarboxylic acid can be in the approximate range of 1:99 to 1:1.

Following dehydrochlorination, the reaction mixture is heated at a temperature in the approximate range of 100° to 200° C. for a period of about 18 to 36 hours. In a preferred procedure, the reaction temperature is increased gradually during the reaction period, e.g., 130° C. for 3 hours, 150° C. for 3 hours, and 165° C. for 16 hours, or 140° C. for 16 hours and 160° C. for 16 hours, or the like. At the end of the reaction period, a small aliquot of the polymer is precipitated from solution into water, washed with water until acid-free and air dried. If the intrinsic viscosity of the polymer in methanesulfonic acid is not within the desired range of about 8 to 35 dl/g, polymerization is continued until an aliquot sample has the desired viscosity.

Intrinsic viscosity is determined by extrapolation of $\eta$ rel-1/c and ln $\eta$ rel/c to zero concentration in methanesulfonic acid at 30° C.

At the end of the reaction period the polymer is precipitated from solution by pouring the reaction mixture into a coagulation bath, such as water or methanol. If a bulk polymer is desired, the reaction mixture is poured directly into the coagulation bath, with or without stirring. The polymer may also be formed into fibers by extruding the polymer/PPA solution through a suitable spinnerette into the coagulation bath. The resulting fiber may be drawn and heat-treated following known procedures.

Alternatively, the amino monomer can be reacted with one of the dicarboxylic acids until the segment has a desired intrinsic viscosity, as determined by one or more aliquot samples. The reaction mixture, is cooled to about 30° to 60° C. and the second diacid monomer is added thereto. The resulting mixture is heated at a temperature in the proximate range of 100° to 200° C. for a period of about 12 to 36 hours. Aliquot samples may be collected, as described previously, to determine the intrinsic viscosity of the resulting polymer.

The copolymer may be crosslinked by heating to a temperature of about 500° to 700° C., preferably about 550° to 600° C., for about 15 to 60 seconds, preferably about 20-40 seconds, in an inert atmosphere. It is believed that the strained methylene bridge between the aromatic rings in the fluorene moiety cleaves to provide active crosslink sites. Simultaneously, the bend within the copolymer structure is eliminated, resulting in a 4,4'-biphenyl linkage.

The following examples illustrate the invention:

EXAMPLE I

2,7-Dicyanofluorene

A solution of 60.6 g of dibromofluorene and 50.2 g of cuprous cyanide in 800 ml of freshly distilled (over calcium hydride) N-methylpyrrollidinone was refluxed with stirring for 24 hours. The hot reaction mixture was poured, with stirring, into a hot solution of sodium cyanide (90 g NaCN in 810 ml water). After standing for 1 hour at 60° C., the resulting suspension was filtered to remove the precipitated product, which was washed with water and allowed to dry on the frit. The crude product was purified by sublimation (200° C./0.10 mm Hg), column chromatography (silica gel - chloroform), and finally by recrystallization from methylene chloride/hexane to yield 18 g (45% yield), mp 298° C. (dec.).

Elemental analysis: Calc'd: C, 83.31; H, 3.73; N, 12.95
Found: C, 82.91; H, 3.75; N, 12.83.
IR: (KBr) 2224 cm$^{-1}$ (CN).
MS: 216 m/e (M+).

EXAMPLE II

Fluorene-2,7-dicarboxylic acid

A mixture of 22.27 9 of 2,7-dicyanofluorene and 542 ml of 100% phosphoric acid (472 9 of polyphosphoric acid and 70 ml of water) was stirred under a nitrogen blanket at 170° C. for 24 hours. After being precipitated in hot water, the crude diacid was isolated by filtration, washed repeatedly on the frit with water, then dried at 140° C./0.10 mm Hg. Yield, 23 g (88%).

EXAMPLE III

Fluorene-2,7-dicarboxylic acid chloride

A mixture of 21.3 g of the product of Example II in 300 ml of freshly distilled thionyl chloride and 5 ml of dry N,N-dimethylformamide was refluxed for 16 hours. The excess thionyl chloride was stripped off under reduced pressure. Toluene was then added to the crude product and distilled off to remove any residual thionyl chloride. This operation was repeated three times. A warm solution of the crude product in dry chloroform was treated with charcoal and the isolated solid was then recrystallized from dry heptane. Yield 12.84 g (50%), mp 253° C.

Elemental analysis: Calc'd: C, 61.88; H, 2.77; Cl, 24.36
Found: C, 61.93; H, 2.83; Cl, 24.31.
IR: (KBr) 1771 cm$^{-1}$ : (COCl).
MS: 290 m/e, 292 m/e, (M+).
$^1$H-NMR (100MHz): CDCl$_3$ :4.11 ppm (s), 8.11 ppm (d), 8.25 ppm (d), 8.37 ppm (m).
$^{13}$C-NMR 36.89 ppm, 121.45 ppm, 131.01 ppm, 133.10 ppm, 145.05 ppm, 146.41 ppm, 168.09 ppm.

EXAMPLE IV

Copolymer synthesis 3.4868 g (18.892 mmol) of 2,5-diamino-1,4-benzenedithiol dihydrochloride, 4.6321 g (17.174 mmol) of terephthaloyl chloride and 0.50 g (1.7174 mmol) of fluorene-2,7-dicarboxylic acid chloride were stirred in 28.096 g of 77% polyphosphoric acid (PPA) at 40° C. for 24 hours. The temperature was raised to 60° C. for 24 hours, then to 100° C. for three hours. After dehydrochlorination was complete, the solution was cooled to room temperature and 9.91 g of phosphorus pentoxide was added to bring the polymer concentration of the reaction mixture to 12 w %. The mixture was heated at 100° C. for 4 hours, then the temperature was raised to 165° C. After being stirred at 165° C for 24 hours, the reaction mixture was poured into water. The precipitated fibrous polymer was washed repeatedly with water, then treated in a blender with water until it was broken up into a fine fibrous form. The fibers were washed with dilute ammonium hydroxide, extracted in a continuous extraction apparatus with water for 24 hours, then dried under reduced pressure (0.05 mm) at 100° C. An intrinsic viscosity of 33.7 dl/g was obtained in methanesulfonic acid at 30° C. Yield 98.7%.

Elemental analysis:
Calc'd: C, 64.07; H, 2.34; N, 10.21; S, 23.37
Found C, 64.13; H, 2.39; N, 10.14; S, 21.66.

EXAMPLE V

A series of copolymers was prepared using the procedure of Example IV. Table I, below, lists polymer concentration, mole % fluorene, reactive group, stir opalescence and intrinsic viscosity for these cooplymers. Except as noted, the arylene dicarboxylic acid was terephthalic acid. In each run, the final reaction temperature was 165° C.

TABLE I

| Run | Polymer Conc. % | Fluorene Mole % | Fluorene Reactive Group | Stir Opalescent | Intrinsic Viscosity |
|---|---|---|---|---|---|
| 1 | 7 | 50 | COCl | No | 6.3 |
| 2 | 12 | 50 | COCl | Yes | 14.4 |
| 3 | 15$^1$ | 50 | COCl | Yes | 4.7 |
| 4 | 10 | 50 | CN | No | 11.5 |
| 5 | 10 | 50 | COCl | Yes | 11.4 |
| 6 | 8 | 50 | COCl | No | 11.3 |
| 7 | 14 | 10 | COCl | Yes$^2$ | 15.8 |
| *8$^3$ | 12 | 10 | COCl | Yes$^2$ | 33.7 |
| 9$^3$ | 14 | 10 | COCl | Yes$^2$ | 9.8 |
| 10$^3$ | 12 | 20 | COCl | Yes$^2$ | 10.3 |
| 11 | 12 | 20 | COCl | Yes$^2$ | 9.8 |

*Polymer of Example IV
Note:
$^1$Polymer precipitated from solution.
$^2$Persistent stir opalescence.
$^3$Terephthaloyl chloride used.

Thermooxidative stability of these copolymers is very high. With regard to the copolymer of Run 2, above, onset of weight loss did not occur until the temperature exceeded 550° C.

EXAMPLE VI

The polymers of Runs 7 and 8, above, were selected for processing into fiber. Fibers were spun using a dry-jet wet spinning method from polyphosphoric acid solutions of each of the copolymers. The air gap between the spinnerette and coagulation bath was 200 mm, and the fibers were stretched to draw ratios of 10, 20 and 30. The fibers were neutralized with 3% NH$_4$OH solution, then dried in air at 150° C. under 100 MPa tension. The fibers were heat treated in a tube oven under nitrogen atmosphere using feed and take-up godets. Oven residence time was 40 sec and tension was maintained at 100 MPa.

Tensile and compressive properties were measured from single filament tests using an Instron Testing Machine (Model 1130) with 1, 3 and 5" gauge length samples. Results were corrected for machine compliance. The uniaxial compressive strength was determined at 1" gauge length using the recoil test. Tensile (T.S.), modulus (MOD) compressive strength (C.S.), elongation at break (Eb), heat treatment temperature (HT TEMP) and spin draw ratio (SDR) for the copolymer fibers are given in Table II, below:

TABLE II

Mechanical Properties of Copolymer Fibers

| Run | POLYMER I.V. | HT TEMP (°C.) | SDR | T.S. (ksi) | MOD (Msi) | Eb (%) | C.S. (Ksi) |
| --- | --- | --- | --- | --- | --- | --- | --- |
| 7 | 16 | 420 | 10 | 170 ± 25 | 30 | 0.6 ± 0.1 | 45–62 |
|  |  | 500 | 10 | 160 ± 20 | 30 | 0.8 ± 0.4 | 50–60 |
| 8 | 34 | 550 | 20 | 270 ± 70 | 34 | 1.3 ± 0.2 | 65–70 |
|  |  | 600 | 20 | 260 ± 40 | 24 | 2.6 ± 0.9 | 65–82 |
|  |  | 650 | 20 | 300 ± 60 | 29 | 1.1 ± 0.2 | 46–51 |
|  |  | 700 | 20 | 450 ± 100 | 45 | 1.1 ± 0.2 | 25–50 |

Homopolymer polybenzobisthiazole fibers processed under similar conditions, generally have a C.S. of about 45–50 Ksi. In comparison, the copolymer fibers of this invention, when heat treated in the range of 500–600° C. have greater compressive strength.

Heat treated fibers from run 8 were placed in methanesulfonic acid. The fibers swelled, but did not dissolve, thus indicating that crosslinking had taken place during the heat treatment.

Various modifications may be made to the invention as described without departing from the spirit of the invention or the scope of the appended claims.

We claim:

1. A para-ordered, rigid-rod aromatic heterocyclic copolymer having repeating groups of the formula:

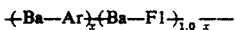

wherein x has a value of 0.50 to 0.99, F1 is a 2,7-fluorene moiety, Ar is a para-ordered arylene group and Ba is a benzazole group of the formula:

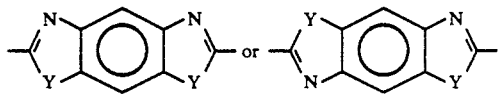

wherein Y is S.

2. The copolymer of claim 1 wherein Ar is 1,4-phenylene.

3. The copolymer of claim 1 wherein x is 0.9.

4. The copolymer of claim 1 wherein x is 0.8.

5. The copolymer of claim 1 wherein x is 0.5.

* * * * *

UNITED STATES PATENT AND TRADEMARK OFFICE
CERTIFICATE OF CORRECTION

PATENT NO. : 5,066,769
DATED : November 19, 1991
INVENTOR(S) : Robert C. Evers et al It is certified that error appears in the above-identified patent and that said Letters Patent is hereby corrected as shown below:

Abstract, line 4, "β" should read --B--

Col 1, line 53, "$(Ba-Ar)_{\overline{x}}(Ba-Fl)_{\overline{1.0\ x}}$" should be
-- $(Ba-Ar)_{\overline{x}}(Ba-Fl)_{\overline{1.0-x}}$ --.

Col 2, line 68, "proximate" should be --approximate--.

Col 3, line 39, "472 9" should be --472 g--.

Col 4, line 28, a colon should follow "Found".

Col 6, line 8, "$(Ba-Ar)_{\overline{x}}(Ba-Fl)_{\overline{1.0\ x}}$" should be
-- $(Ba-Ar)_{\overline{x}}(Ba-Fl)_{\overline{1.0-x}}$ --.

Signed and Sealed this

Ninth Day of March, 1993

*Attest:*

STEPHEN G. KUNIN

*Attesting Officer*     *Acting Commissioner of Patents and Trademarks*